United States Patent

[11] 3,616,010

| | | |
|---|---|---|
| [72] | Inventors | Harry E. Dunholter;<br>James C. Jones, both of Toledo, Ohio |
| [21] | Appl. No. | 788,253 |
| [22] | Filed | Dec. 31, 1968 |
| [45] | Patented | Oct. 26, 1971 |
| [73] | Assignee | Owens-Illinois, Inc. |

[54] MOISTURE-BARRIER CORRUGATED PAPERBOARD AND ITS METHOD OF MANUFACTURE
2 Claims, 4 Drawing Figs.

[52] U.S. Cl. ............................................... 156/210,
156/470, 161/137
[51] Int. Cl. ........................................................ B31f 1/20
[50] Field of Search............................................ 156/203,
205, 210; 161/250, 137

[56] References Cited
UNITED STATES PATENTS

| 1,189,518 | 7/1916 | Wood ............................ | 156/206 |
| 3,256,126 | 6/1966 | Bachofen ....................... | 156/210 |
| 3,307,994 | 3/1967 | Scott, Jr. ....................... | 156/210 |
| 3,308,006 | 3/1967 | Kresse et al.................... | 161/250 X |
| 3,317,363 | 5/1967 | Weber............................ | 156/210 |
| 3,393,118 | 7/1968 | Ekstrom ........................ | 161/250 X |

FOREIGN PATENTS

| 569,352 | 1/1959 | Canada ......................... | 156/210 |

*Primary Examiner*—Samuel W. Engle
*Attorneys*—Alan J. Steger and E. J. Holler

ABSTRACT: A method of manufacturing a sheet of moisture-barrier, thermoplastic, laminated, corrugated paperboard which includes the lamination of a layer of thermoplastic-coated bag stock to either a linerboard or a medium layer prior to the medium layer being corrugated and affixed to the linerboard.

PATENTED OCT 26 1971

INVENTORS
HARRY E. DUNHOLTER
JAMES C. JONES

BY
A.J. Steger
E.J. Holler
ATTORNEYS

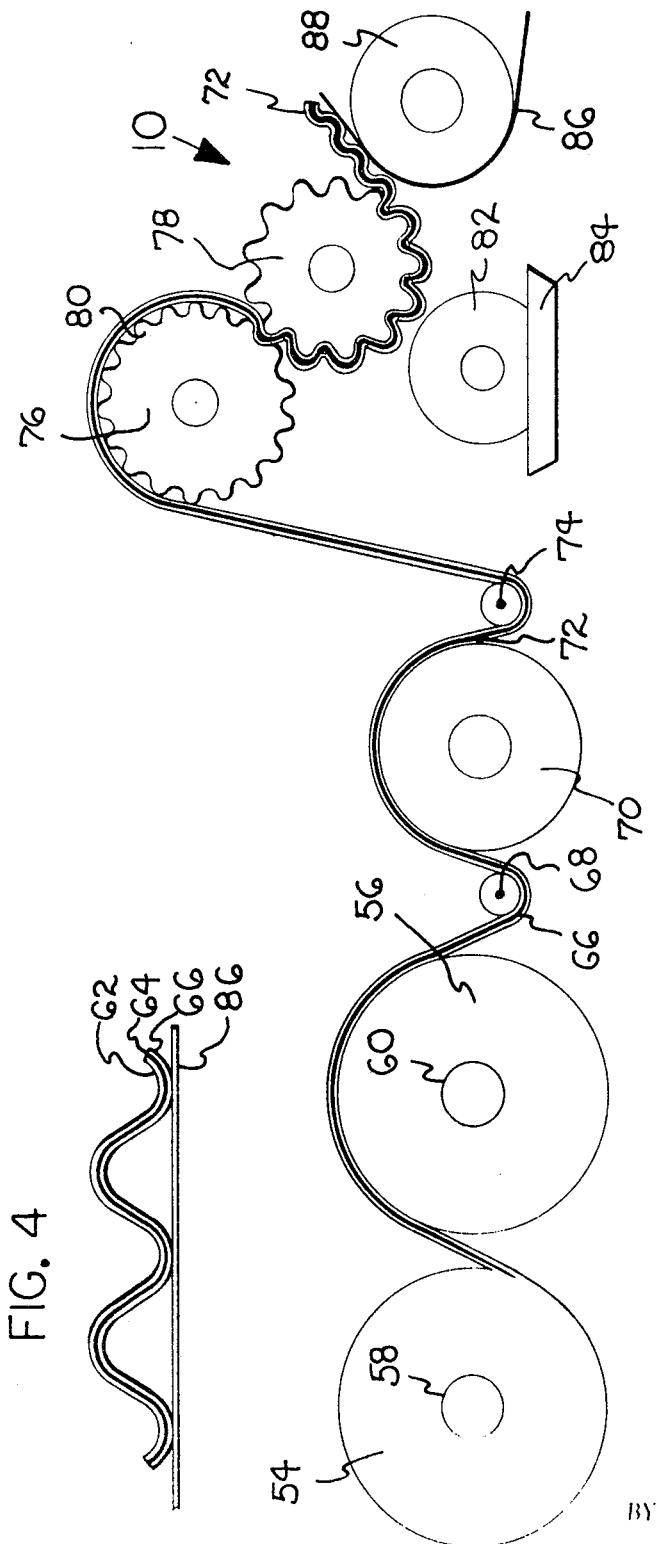

3,616,010

MOISTURE-BARRIER CORRUGATED PAPERBOARD AND ITS METHOD OF MANUFACTURE

BACKGROUND OF THE INVENTION

There has always been a great need for paperboard containers having built-in water resistance for use as shipping containers, both for use in shipping products which must be protected from moisture and for use in high humidity areas where the container strength is seriously affected. During World War II, the need for containers for overseas shipments resulted in the development and use of corrugated containers made with paperboard components containing wet strength resins and water-resistant starch adhesives. More recently, these wet strength agents have been coupled with wax which is either fully or partially impregnated into the container components to provide a moisture-resistant container.

The widespread use of wet strength agents and impregnated wax to make corrugated containers moistureproof has not been successful in satisfying the extremely high requirements placed on today's shipping containers. Today many products, such as poultry, are shipped in ice, thereby requiring a suitable shipping container which is treated to retain the moisture within the container without allowing the moisture to saturate the container and reduce the strength thereof. Additionally, in high humidity areas, normal containers become saturated with humidity which has been absorbed by the container so as to weaken the containers and damage the products contained therein. This absorption of moisture due to high humidity surroundings can potentially cause the paperboard container to lose up to 75 percent of its strength.

Thus, there has been an urgent need for a suitable paperboard packaging material which is effective to retain moisture within the container when desired and which also can effectively prevent external moisture from saturating the container, thereby reducing its strength and potentially destroying the product therein.

It is therefore an object of this invention to provide a corrugated paperboard utilizing regular linerboard and medium which incorporates a thermoplastic film to thereby form a waterproof sheet of corrugated paperboard.

Another object of this invention is to provide a moisture-barrier paperboard suitable for use in containers that can be manufactured on present corrugated equipment without the necessity of investment in new equipment.

A further object of this invention is to provide a moisture-barrier corrugated paperboard suitable for use in a container which is laminated on a standard corrugating machine without the necessity for using water-resistant adhesives and wax impregnation.

Other objects, features and advantages of this invention will become obvious to those skilled in the art to which it pertains upon reference to the following detailed description and the drawings showing the preferred embodiments thereof.

IN THE DRAWINGS

FIG. 3 is a schematic view of the apparatus required to form a sheet of moisture-barrier corrugated paperboard wherein a layer of medium is laminated with a thermoplastic film prior to its passing through the corrugating mechanism.

FIG. 4 is a sectional view of a sheet of paperboard as produced by the apparatus of FIG. 3.

Detailed Description of the Preferred Embodiments

Figure 1:
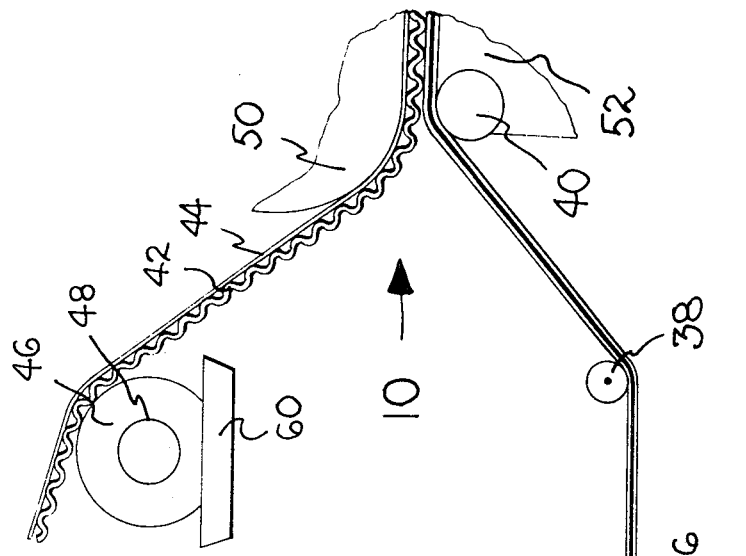
FIG. 1 is a schematic view of the apparatus required to form a sheet of moisture-barrier corrugated paperboard wherein a layer of linerboard is laminated with a thermoplastic film.

More particularly, FIG. 1 shows a section of a corrugating machine 10. The corrugating machinery 10 includes rotary mounts 12 and 14 on which are placed a roll 16 of special bag stock and a roll 18 of standard linerboard, respectively. The special bag stock 16 may be formed from any standard lightweight kraft paper bag stock 20 in the range of 17–17 lbs./MSF (thousand square feet), which has been coated with a layer of suitable thermoplastic material 22 with a thickness in the range of 1/2 mil to 1 mil. Suitable such thermoplastic materials 22 may include polyethylene, polypropylene, etc. The bag stock 20 coated with thermoplastic material 22 is unreeled from roll 16 and fed around a suitable guide roll 24.

The linerboard roll 18 contains a suitable kraft linerboard 26 such as 26 lb./MSF. The linerboard 26 is unwound from the roll 18 and fed around a guide roll 28 at which point it comes into contact with the thermoplastic film 22 on the bag stock 20. THe combined layers of linerboard 26 and bag stock 20 with the thermoplastic layer 22 are passed over a preheater 30, which may be either a stationary or a rotating drum positioned on mount 32. Preheater 30 may be of any suitable type and should be capable of heating the combined layers to a temperature in the range of 350° F. as the layers pass thereover. It is in this range that the selected thermoplastic materials are able to fuse with the linerboard 26 and the bag stock 20 so as to form a thermoplastic laminated linerboard 34. It should be understood that this preheater temperature can be varied depending on the desired running speed and upon the type of thermoplastic material utilized. The resulting laminated linerboard 34 is passed around guide rolls 36 and 38 as it leaves the preheater 30 and then fed into a standard double face hot plate section 40 of the corrugating mechanism 10. Simultaneously, a combined sheet of a corrugated medium 42 and a linerboard 44 is fed into the double face hot plate section 40. It is suggested that the corrugated medium 42 may be of a suitable semichemical medium such as a 26 lb./MSF. The linerboard layer 44 may be formed from a kraft linerboard material such as a 42 lb./MSF. The medium layer 42 and the linerboard layer 44 have been adhesively joined previously at a standard single facer (not shown) of the corrugating mechanism 10. As these components are fed towards the hot plate section 40, the corrugated medium component 42 is passed over an adhesive applicator roll 46 which is suitably mounted at 48 so as to rotate through an adhesive pan 50. Thus, one side of the corrugated medium 42 is coated with a suitable adhesive as the combined layers are fed into the press section. The combined layers 42 and 44 are guided into the hot plate section 40 by means of a suitable conveyor belt 50. The press section includes a hot plate 50 which provides sufficient heat to set the adhesive on medium layer 42 and bond the laminated linerboard 34 to the medium layer 42.

Figure 2:
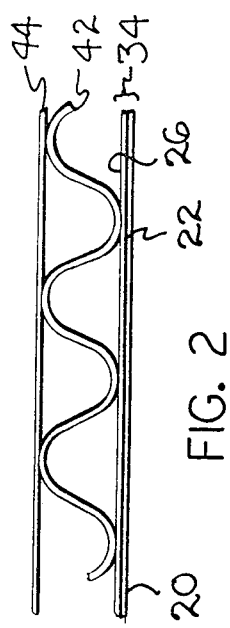
FIG. 2 is a sectional view of the moisture-barrier corrugated paperboard as produced by the apparatus of FIG. 1.

The resultant structure which is produced by this apparatus is shown in FIG. 2 where it can be seen that corrugated medium component 42 is sandwiched between and fixed to the linerboard 44 and the laminated linerboard component 34, which includes a layer of linerboard 26, a thermoplastic film 22, and a layer of bag stock 20.

The type of thermoplastic laminated corrugated paperboard as shown in FIG. 1 and FIG. 2 is particularly suited for use in closed container applications where it is desired to either retain moisture within the container or prevent moisture from entering the container. If it is desired to retain moisture within the container, the laminated linerboard layer 34 should be positioned on the inside of the container constructed from the moisture-barrier corrugated paperboard. Conversely, if it is desired to keep external moisture from entering the container, the laminated linerboard layer 34 should be positioned so as to be the external surface of the container formed from this material.

FIG. 3 shows a section of a standard corrugating apparatus 10 which is arranged so as to be suited to produce a moisture-barrier corrugated paperboard wherein the medium layer is laminated with a thermoplastic film. More particularly, FIG. 3 includes a roll 54 of bag stock and a roll 56 of medium, which are positioned on suitable rotating mounts 58 and 60. The roll 54 is comprised of bag stock 62 which is coated with a layer of thermoplastic film 64. The bag stock 62 and the thermoplastic film 64 are identical with layers 20 and 22 as described in conjunction with FIG. 1. The roll 56 is comprised of medium board 66 which is of the standard type as described in conjunction with medium layer 42 in FIG. 1. The bag stock 62 and in thermoplastic film 64 are fed from roll 54 onto roll 56 so as to be positioned adjacent to medium layer 66 from which the combination of layers are fed around guide roll 68 to preheater 70. Preheater 70 is substantially identical to the preheater 30 in FIG. 1 and must be capable of heating the layers passing thereover to a suitable temperature as described previously. As was the case in FIG. 1, as the combined layers pass over the preheaters 70, the thermoplastic film 64 is heated to a point where it can become fused with the layer of bag stock 62 and the medium layer 66. THe combination then leaves the preheater 70 as a thermoplastic laminated medium 72 and passes around guide roll 74 on its way to the corrugating rolls 76 and 78. The corrugating rolls 76 and 78 are of a standard type having a plurality of flute-forming teeth 80 around their outer circumference which loosely mesh with each other as the medium passes therebetween, thereby forming the flutes or corrugations in the medium layer. Thus, the thermoplastic laminated medium layer 72 passes around and between the corrugating layers 76 and 78 and then comes into contact with a rotating adhesive applicator 82 which distributes adhesive which is stored in adhesive pan 84. After coming in contact with the adhesive applying roll 82, the laminated medium 72 is fed into contact with a layer of linerboard 86 and pressed thereto between the corrugating roll 78 and the linerboard guide roll 88. The linerboard 86 may be of any suitable type such as that described in connection with layer 44 in FIG. 1. Thus, a single-faced layer of corrugated paperboard has been produced which has a moisture-barrier thermoplastic laminated medium. If it is desired to have a double-faced corrugated paperboard, the single-faced product of this apparatus could be combined with another layer of linerboard at a later stage (not shown) on the corrugating apparatus 10.

The resulting product as produced by the apparatus of FIG. 3 is shown in detail in FIG. 4. Here it can be seen that a single-faced sheet of moisture-barrier paperboard has been manufactured which includes a single layer of linerboard 86 which is affixed to a laminated corrugated medium which includes a layer of bag stock 62 and a layer of medium 66 with a layer of thermoplastic material 64 fused and laminated therebetween.

The product as produced by the apparatus of FIG. 3 and as shown in FIG. 4 is well suited to provide a superior strength paperboard for closed containers which are to be shipped in high humidity or damp areas. As has been described previously, high humidity or dampness may cause a sheet of corrugated paperboard to lose up to 75 percent of its strength due to the moisture gained thereby. Hence, the incorporation of this thermoplastic film prevents the soaking through of moisture in the corrugated medium, thereby helping it to maintain its strength in high moisture surroundings.

It should further be noted that a medium layer such as that designated as 66 may have a layer of bag paper and a thermoplastic film laminated to each of its sides so as to produce a double laminated medium. This configuration is particularly desirable for use in an open type container where moisture can approach the medium layer from either side. The apparatus of this invention can be easily adapted to provide such a double laminated medium.

Additionally, it should be understood that a web of corrugated paperboard may be produced in accordance with this invention which has both a thermoplastic laminated medium and a thermoplastic laminated linerboard. This product would combine moisture resistance with good strength characteristics at high humidity.

Also, this invention contemplates the use of a free film of thermoplastic material in place of the thermoplastic-coated bag stock to be directly laminated between the linerboard and the medium. However, the use of the thermoplastic-coated bag stock is desirable to facilitate the utilization of normal processing procedures.

Therefore, it should be clear that this invention teaches the use of standard corrugating apparatus to laminate either a standard linerboard component or a standard medium component with a film of moisture-resistant thermoplastic material to provide a sheet of corrugated paperboard suitable for use in paperboard containers which is moisture-resistant and which provides increased strength in high humidity surroundings.

It should be obvious to those skilled in the art that many changes and modifications may be made to the embodiment shown and described without changing the scope of the invention as defined in the appended claims.

We claim:

1. An improved method of manufacturing moisture-barrier corrugated paperboard including at least one liner layer having a thermoplastic film fused therewith which comprises the steps of:
   bringing a continuously advancing web of combined thermoplastic film and bag stock paper into face-to-face contact with a continuously advancing web of linerboard;
   passing said joined webs over a heating element with said bag stock paper in contact with said heating element so that heat is applied through said bag stock paper to fuse said thermoplastic film with said bag stock paper and said linerboard to completely laminate said bag stock paper to said linerboard to form a laminated web of bag stock paper and linerboard having an intermediate layer of thermoplastic film fused therebetween;
   applying adhesive to a continuously advancing web of corrugated medium board;
   bring said laminated liner web into contact with said adhesively coated web of corrugated medium board;
   and bonding said laminated liner web to said adhesively coated web of corrugated medium board to form moisture-barrier corrugated paperboard.

2. An improved method of manufacturing wet strength corrugated paperboard including a medium layer having a thermoplastic film fused therewith which comprises the steps of:
   bringing a continuously advancing web of combined thermoplastic film and bag stock paper into face-to-face contact with a continuously advancing web of medium board;
   passing said joined webs over a heating element with said bag stock paper in contact with said heating element so that heat is applied through said bag stock paper to fuse said thermoplastic film with said bag stock paper and said medium board to completely laminate said bag stock paper to said medium board to form a laminated medium web of bag stock paper and medium board having an intermediate layer of thermoplastic film fused therebetween;
   corrugating said laminated medium web;
   1 applying adhesive to said laminated medium web;
   bringing said adhesively coated, laminated medium web into contact with at least one continuously advancing web of linerboard;
   and bonding said adhesively coated, laminated medium web to said web of linerboard to form wet-strength corrugated paperboard.

PO-1050
(5/69)

UNITED STATES PATENT OFFICE
CERTIFICATE OF CORRECTION

Patent No. 3,616,010      Dated October 26, 1971

Inventor(s) Harry E. Dunholter; James C. Jones

It is certified that error appears in the above-identified patent and that said Letters Patent are hereby corrected as shown below:

Column 2, line 2, "17-17" should be --7-17--. Column 3, line 4, delete "in". Column 4, line 38, "bring" should be --bringing--.

Signed and sealed this 14th day of March 1972.

(SEAL)
Attest:

EDWARD M. FLETCHER, JR.            ROBERT GOTTSCHALK
Attesting Officer                   Commissioner of Patents